Aug. 5, 1969   H. REUSSNER   3,459,432
OIL CONTROL PISTON RING
Filed Oct. 5, 1967

INVENTOR
HORST REUSSNER
BY
Stephens, Huettig & O'Connell
ATTORNEYS

United States Patent Office 3,459,432
Patented Aug. 5, 1969

3,459,432
OIL CONTROL PISTON RING
Horst Reussner, Stuttgart-Bad Cannstatt, Germany, assignor to Mahle Komm.-Ges., Stuttgart-Bad Cannstatt, Germany
Filed Oct. 5, 1967, Ser. No. 673,209
Claims priority, application Germany, Nov. 26, 1966, M 71,791
Int. Cl. F16j 15/00, 9/06; F02f 5/00
U.S. Cl. 277—163
1 Claim

ABSTRACT OF THE DISCLOSURE

An oil control piston ring for an internal combustion engine has a coil expander spring seated in a groove in the inner circumference of said spring. The groove has flattened portions adjacent the ring end joint which reduce the wear of the ring without reducing the sealing effectiveness of the ring.

---

This invention relates to an oil control piston ring for an internal combustion engine and, in particular, to a coil spring expander seated in a groove in the piston ring.

As in all piston rings the situation exists that the cylinder circumference differences in the expansion zone of the ring are absorbed by the changes in the circumference of the ring. This causes a tangential oscillating relative movement between the ring and the spring, and this movement is greatest at the ring joint and causes in the ring joint portions a considerable wear and tear on the spring. This wear and tear limits the life span of the coil spring and thus many efforts have been made to reduce this wear and tear. Special efforts have been made by treating the surface of the spring and the surface of the ring groove. Variations of the cross-sections of the spring and ring groove have also been tried.

This invention solves the wear and tear problem in another way. In general, the groove in which the coil spring is seated has flattened portions adjacent the ring joint. These flattened portions have a depth in the direction of the radius of the ring of from 0.3 to 0.9% of the nominal diameter of the ring, which depth is steadily reduced from the ring joint outward into the ring. The length of these flattened portions is about approximately 35% of the nominal ring diameter. This produces a very soft and scarcely noticeable transition from the ring joint to the unchanged portion of the ring groove.

Because of this simple technique which is applicable to all known forms of spring shapes and groove shapes, a very considerable reduction in the wear and tear on the coil spring is achieved without impairing in the least the effectiveness of the ring seal.

This favorable effect is apparently due to the fact that the coil spring enters the flattened portions and braces the ring sufficiently strongly at the ring joint. However, the spring pressure against the flattened portions within the range of the flattened portions is reduced to such a point that the reduction in wear and tear on the spring is nevertheless achieved.

The means by which the objects of the invention are obtained are described more fully with reference to the accompanying drawings in which.

Figure 1:
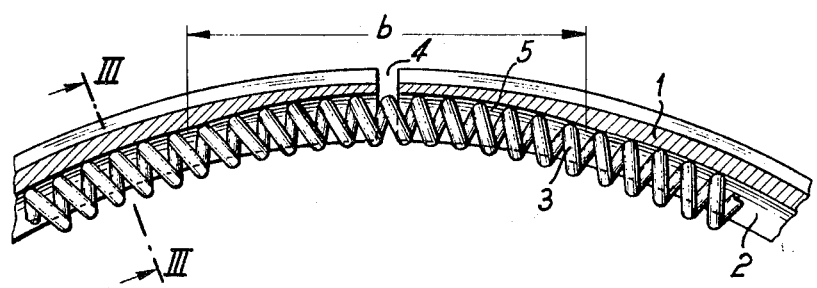
FIGURE 1 is a longitudinal cross-section through the ring joint part of a piston ring as taken on line I—I in FIGURE 3.
Figure 2:
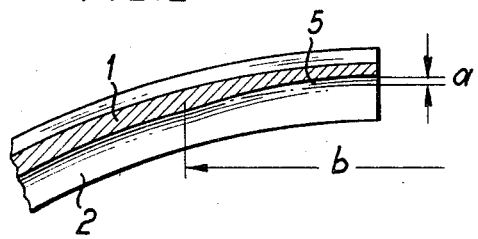
FIGURE 2 is a cross-sectional view through the ring joint part of the piston ring.
Figure 3:
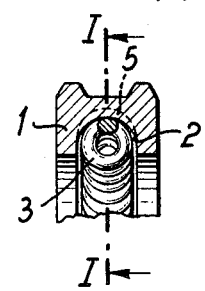
FIGURE 3 is a cross-sectional view taken on the line III—III of FIGURE 1.

The oil control piston ring 1 has the conventional groove 2 on the inner circumference of the groove and in which the coil spring 3 is seated. The base of the groove which forms the bed for the spring is concentric with the outer circumference of the piston ring, except adjacent the ring joint 4. Adjacent the ring joint 4, the bottom of the groove has flattened portions 5 whose depth $a$ in the direction of the ring radius at the end of the ring joint is about 0.3 to 0.9% of the nominal ring diameter and whose length $b$ is about 35% of the nominal ring diameter.

Having now described the means by which the objects of the invention are obtained, I claim:

1. An oil control piston ring for an internal combustion engine comprising a circular ring having a ring end joint, a groove extending around the inner circumference of said ring, and flattened portions in said groove adjacent said joint having a depth (a) in the ring radial direction of about from 0.3 to 0.9% of the nominal ring diameter and which depth is steadily reduced from the ring joint outward into the ring, and which flattened portions extend to about 35.0% of the nominal ring diameter.

References Cited

UNITED STATES PATENTS 909,983   1/1909   Bomcke _____ 277—163

LOUIS K. RIMRODT, Primary Examiner